United States Patent
Morales

(10) Patent No.: US 11,567,719 B1
(45) Date of Patent: Jan. 31, 2023

(54) METHODS FOR PROCESSING DOCUMENTS FOR USE IN VARIABLE DATA PRINTING OPERATIONS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/490,362

(22) Filed: Sep. 30, 2021

(51) Int. Cl.
*G06F 3/12* (2006.01)

(52) U.S. Cl.
CPC ............ *G06F 3/127* (2013.01); *G06F 3/1208* (2013.01); *G06F 3/1243* (2013.01)

(58) Field of Classification Search
CPC ...... G06F 3/127; G06F 3/1208; G06F 3/1243; G06F 40/106; G06F 40/174
See application file for complete search history.

(56) References Cited

U.S. PATENT DOCUMENTS

| | | | |
|---|---|---|---|
| 7,468,805 B2 | 12/2008 | Lo et al. | |
| 2005/0094205 A1* | 5/2005 | Lo | G06F 40/106 358/1.18 |
| 2005/0094207 A1* | 5/2005 | Lo | G06F 40/174 358/1.18 |
| 2005/0240393 A1* | 10/2005 | Glosson | G06F 40/166 704/8 |
| 2008/0186537 A1 | 8/2008 | Isobe | |
| 2020/0314250 A1* | 10/2020 | Kobayashi | G06V 30/412 |

* cited by examiner

*Primary Examiner* — Iriana Cruz
(74) *Attorney, Agent, or Firm* — Millen, White, Zelano & Branigan, P.C.; William Nixon

(57) ABSTRACT

Methods for identifying and generating a preview set of documents for use with variable data printing operations reduce the number of records that are previewed using filtering criteria. Records to be included in the preview set include text objects having text variables, image objects having image variables, and barcode objects having barcode variables. Records for the preview set also include those defined by rules and associated conditions based on data provided to generate the documents. A better representation of the variable data print job is provided.

20 Claims, 7 Drawing Sheets

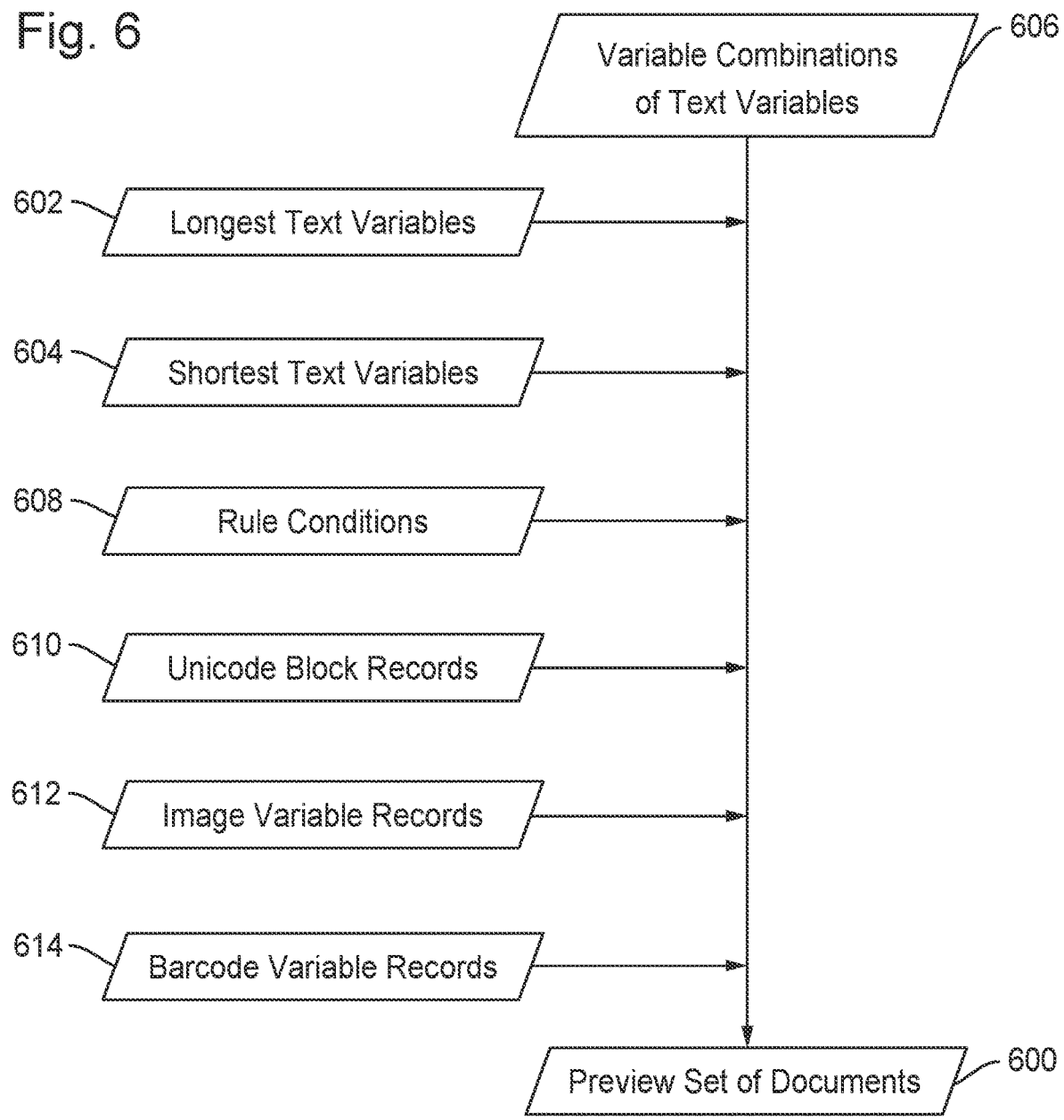

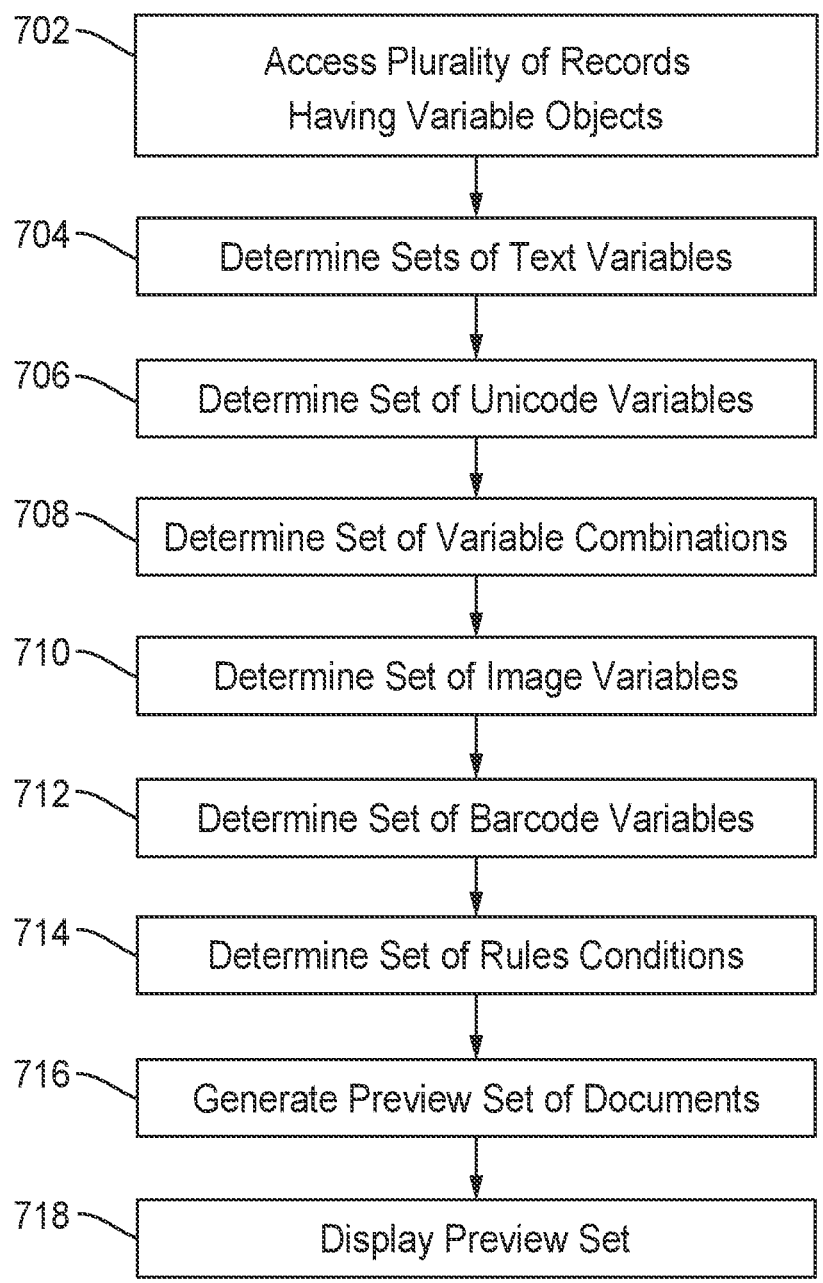

METHODS FOR PROCESSING DOCUMENTS FOR USE IN VARIABLE DATA PRINTING OPERATIONS

FIELD OF THE INVENTION

The present invention relates to processing documents used in variable data printing operations. More particularly, the present invention relates to providing a preview of a subset of documents being used in variable data printing operations.

DESCRIPTION OF THE RELATED ART

A challenge for advanced variable data printing (VDP) composition is making sure that the design template works in all variety of the documents used in the subject case. Simple VDP jobs can filter the list of jobs to the shortest or longest record for any given value. This approach, however, does not perform well for more complex designs or for more complex compositions, such as a rules-based composition.

SUMMARY OF THE INVENTION

A method for identifying a preview set of documents used in variable data printing operations is disclosed. The method includes accessing a plurality of records having text objects and image objects for a document template printable at a printing device. At least one text object includes text variables and at least one image object includes image variables. The method also includes determining a first set of records including a longest record of each text variable of the text variables of the at least one text object. The method also includes, for the at least one text object, identifying a second set of records having variable combinations of the text variables. The variable combinations include a longest combination of each variable combination and a shortest combination of each variable combination. The method also includes determining that the at least one text object corresponds to a rule having a condition. The method also includes determining a third set of records based on the condition for the rule as applied to the at least one text object. The method also includes generating the preview set of documents from the first set of records, the second set of records, and the third set of records.

A method for identifying a preview set of documents used in variable data printing operations is disclosed. The method includes accessing a plurality of records having text objects and barcode objects for a document template printable at a printing device. At least one text object includes text variables and at least one barcode object includes barcode variables. The method also includes determining a first set of records including a longest record of each text variable of the text variables of the at least one text object. The method also includes, for the least one text object, identifying a second set of records having variable combinations of the text variables. The variable combinations include a longest combination of each variable combination and a shortest combination of each variable combination. The method also includes determining that the at least one text object corresponds to a rule having a condition. The method also includes determining a third set of records based on the condition for the rule as applied to the at least one text object. The method also includes identifying a fourth set of records having at least one barcode variable of the barcode variables. The method also includes determining that one of the at least one barcode variable corresponds to a rule having a condition. The method also includes determining a fifth set of records based on the condition for the rule as applied to the one of the at least one barcode variable. The method also includes generating the preview set of documents from the first set of records, the second set of records, the third set of records, the fourth set of records, and the fifth set of records.

A method for identifying a preview set of documents to be used in a print job according to variable data printing operations is disclosed. The method includes accessing a plurality of records having text objects for a document template. At least one text object includes text variables located in separate positions within the text object. The method also includes determining a first set of records including a longest record of each location of a text variable of the text variables of the at least one text object. The method also includes, for the at least one text object, identifying a second set of records having variable combinations of the text variables. The variable combinations include a longest combination of each variable combination and a shortest combination of each variable combination. The method also includes generating the preview set of records from the first set of records and the second set of records. The method also includes providing the preview set of documents for a preview of the print job at a computing device.

BRIEF DESCRIPTION OF THE DRAWINGS

Various other features and attendant advantages of the present invention will be more fully appreciated when considered in conjunction with the accompanying drawings.

FIG. 6 illustrates a block diagram of sets of documents to generate a preview set of documents according to the disclosed embodiments.

FIG. 7 illustrates a flowchart for identifying a preview set of documents for variable data printing operations according to the disclosed embodiments.

DETAILED DESCRIPTION OF THE PREFERRED EMBODIMENTS

Figure 1:
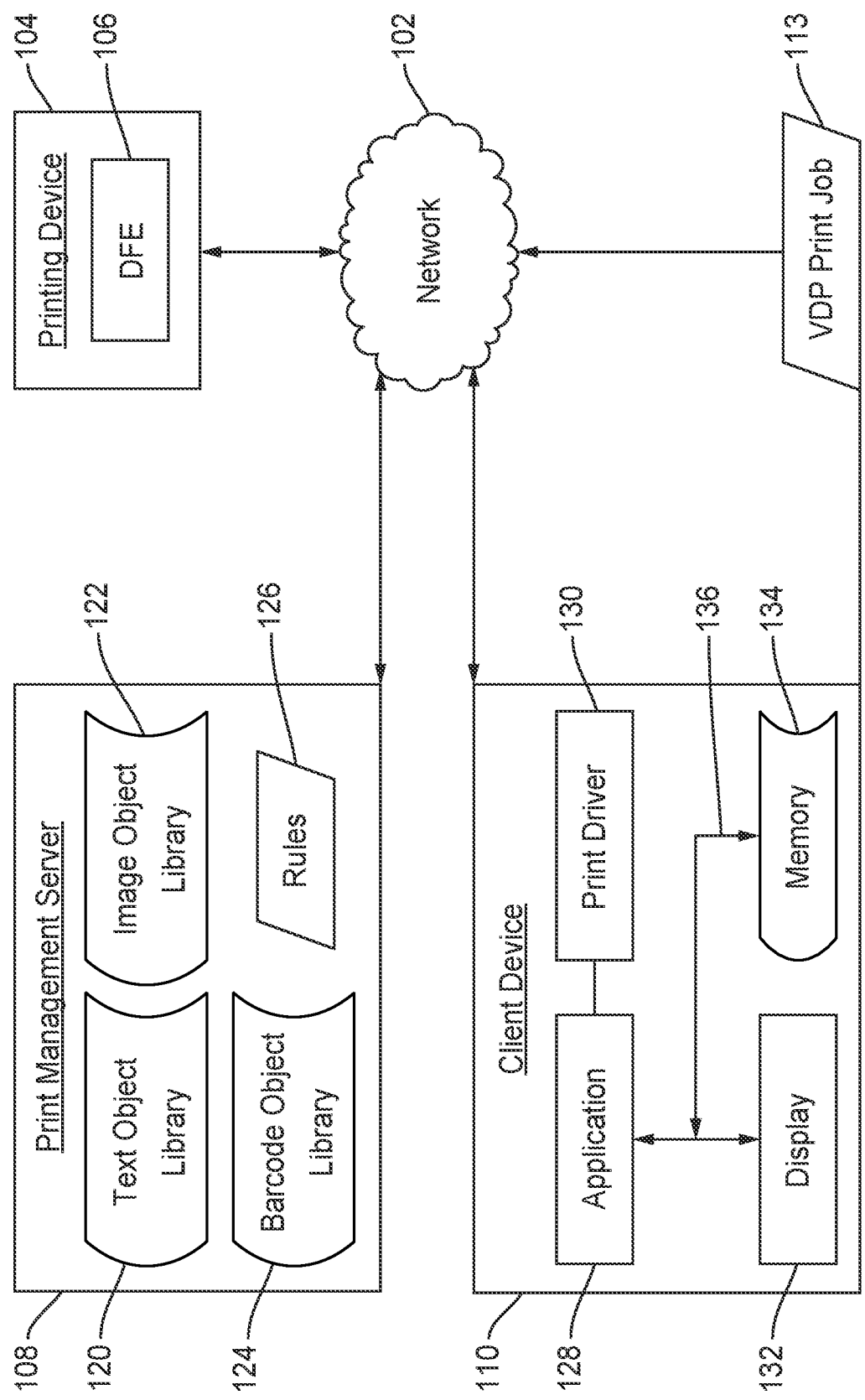
FIG. 1 illustrates a block diagram of a printing system for variable data printing operations according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments may add a "smart filter" option to a VDP application. The smart filter option would identify the records shown to the user according to rules and criteria. The records would be added to the set of previews based on the rules and criteria.

Records may include documents having text variables. The disclosed embodiments may add the shortest and the longest record for each text variable. The disclosed embodiments also may add a record for each Unicode block found in the data. The record may be added according to one of the several criteria or rules. The record having the Unicode block may be added as being the shortest or the longest record for each Unicode block. The disclosed embodiments also may add the first record found for each Unicode block. The disclosed embodiments also may add a random record forms the records that use a given Unicode block. The disclosed embodiments also may give preference to records that use multiple Unicode blocks in order to minimize the total number of records in the smart preview. The disclosed embodiments also may add records that use multiple Unicode blocks, except those using Basic Latin and another block.

The documents may include text objects that use text variables. Examples may include name, address, city, state, location code, and the like. The disclosed embodiments seek to identify outliers in the data for the preview set. Thus, the disclosed embodiments may add, for each text object that uses variables, the records with the shortest and longest variable combinations. For example, if a text object has variables A, B, and C, then the shortest and longest records for the following combinations should be added: A+B, A+C, B+C, and A+B+C.

For each text object that uses rules, the disclosed embodiments add a record for each condition in the rule. For example, is a text object has a rule that states if (A), else if (B), else if (C), else if (D), then the disclosed embodiments would add records for which A, B, C, or D are true. It also would add rules for when none of these conditions are true.

The disclosed embodiments also may take into account image objects having image variables. Unique image files may be inserted into the document template based on criteria or rules. The disclosed embodiments add a record for each unique image file, unless each record uses a unique image file. Uniqueness may be evaluated using the complete image uniform resource locator (URL). If not covered by the above, then the disclosed embodiments may add a record for each image object that uses variables. For each image object that uses rules, the disclosed embodiments add a record for each condition in the rule.

The disclosed embodiments also may take into account barcode objects having barcode variables. Most barcode variations may be covered by filtering for text variables as disclosed above. If the barcode value is a URL, then the disclosed embodiments add a record for each unique URL, unless each record uses a unique URL. Uniqueness may be evaluated using the complete URL in the barcode. For each barcode object the uses variables, the disclosed embodiments add the records with the shortest and longest variable combinations. For each barcode object that uses rules, the disclosed embodiments add a record for each condition in the rule.

The document also may include document pages that use rules. For each document page using rules, the disclosed embodiments add a record for each condition in the rule. A preview may be shown to the user in the same manner as traditional VDP previews, with some important differences. The records are filtered according to the criteria and rules disclosed above. Each record displays information stating why it is included in the preview. This feature will help users understand what they should be evaluating when they view each record in the preview.

FIG. 1 depicts a printing system 100 for variable data printing operations according to the disclosed embodiments. Printing system 100 may be located in a print shop or other environment suitable for production printing operations. Printing system 100 includes one or more printing devices 104 that receive print jobs from one or more client devices 110. Further, printing operations may be managed by print management server 108. As shown in FIG. 1, VDP print job 113 is submitted from client device 110 to printing device 104, but it also may be submitted to print management server 108 which selects printing device 104 to complete the job.

Client device 110 may be capable of executing applications and programs 128 to generate documents and files, such as, for example, a computer, a laptop computer, mobile device or tablet, smart phone, kiosk, and the like. Client device 110 may send print jobs to printing device 104 over one or more networks 102 implemented within printing system 100 using print driver 130. Print driver 130 converts the data generated or created by application 128 into a format that printing device 104 can understand. The result is print job 113. Additional client devices may be connected to printing device 104, which submit print jobs to printing device 104 or print management server 108.

Variable designer application 128 may be an application that enables VDP printing operations. Application 128 may differ from a conventional desktop publishing application in that it implements a variable area on documents. The variable areas, or objects, include setting of unique information so that contents to be displayed can be changed according to information provided in data records as well as from libraries or a database. The unique information can be expressed by a conditional relationship representing a relationship between a variable, or attribute, of each area and data provided to application 128.

A user may execute application 128 to generate VDP print job 113, as disclosed in greater detail below. A preview of a set of documents corresponding to VDP print job 113 may be displayed at client device 110 in display 132. Memory 134 may store VDP print job 113 as well as various objects and data used to generate the print job. The components within client device 110 may be connected by bus 136 to receive and transmit data and signals.

Network 102 may be used by system 100 to exchange data between the devices within system 100. The devices are configured to communicate with network 102 over a physical communications interface or layer such as air interfaces and/or a direct wired connection. Air interfaces may be a given cellular communications protocol (e.g., GSM, CDMA, W-CDMA, EVDO, eHRPD, EDGE, 4G LTE, 5G LTE, 5G NR/New Radio, etc.) and, or a wireless IP protocol (e.g., IEEE 802.11 family) Alternatively, network 102 may be a local area network, wide area network, an ad-hoc network. Network 102 allows printing device 104 and client device 110 to exchange data using the appropriate protocol.

Printing device 104 is disclosed in greater detail below. It includes embedded digital front end (DFE) 106, or a printing device controller, that is the workflow touchpoint which accepts a print job, or print file, commonly a PDF or PostScript file. DFE 106 converts the file of a received print job into a format that print engine 260, disclosed below, can use to lay down the content of the document corresponding to the print job on a media. DFE 106 may include a raster image processor (RIP) as well as other components. DFE 106 also may schedule when a received print job is processed and other operations related to printing operations.

Print management server 108 may interact with printing device 104 and client device 110 to perform variable data printing operations. In some embodiments, VDP print job 113 is submitted to print management server 108, which then forwards the print job to printing device 104. Print management server 108 may include libraries and other data storage components to enable application 128 to generate VDP print job 113.

For example, print management server 108 may include text object library 120 that stores text variables, data for filling a text object within one or more documents in VDP print job 113, Unicode blocks, and other information to be used in filling the text object. It also includes image object library 122 that includes image variables to be used within one or image objects within the documents. The image variables may include a unique image file that may be retrieved using a URL. Print management server 108 also includes barcode object library 124 that includes barcode variables to be used within one or more barcode objects within the documents. The barcode variables may include a unique barcode file that may be retrieved using a URL. Server 108 also includes rules 126 that define what information may be displayed or printed within one or more of the objects embedded in the documents of VDP print job 113.

In some embodiments, print management server 108 is not within printing system 100. In such a case, the functions and features of print management server 108 are provided at client device 110 in conjunction with application 128 or implemented at printing device 104 using DFE 106. For example, libraries 120, 122, 124, and 126 may be implemented at client device 110.

Figure 2:
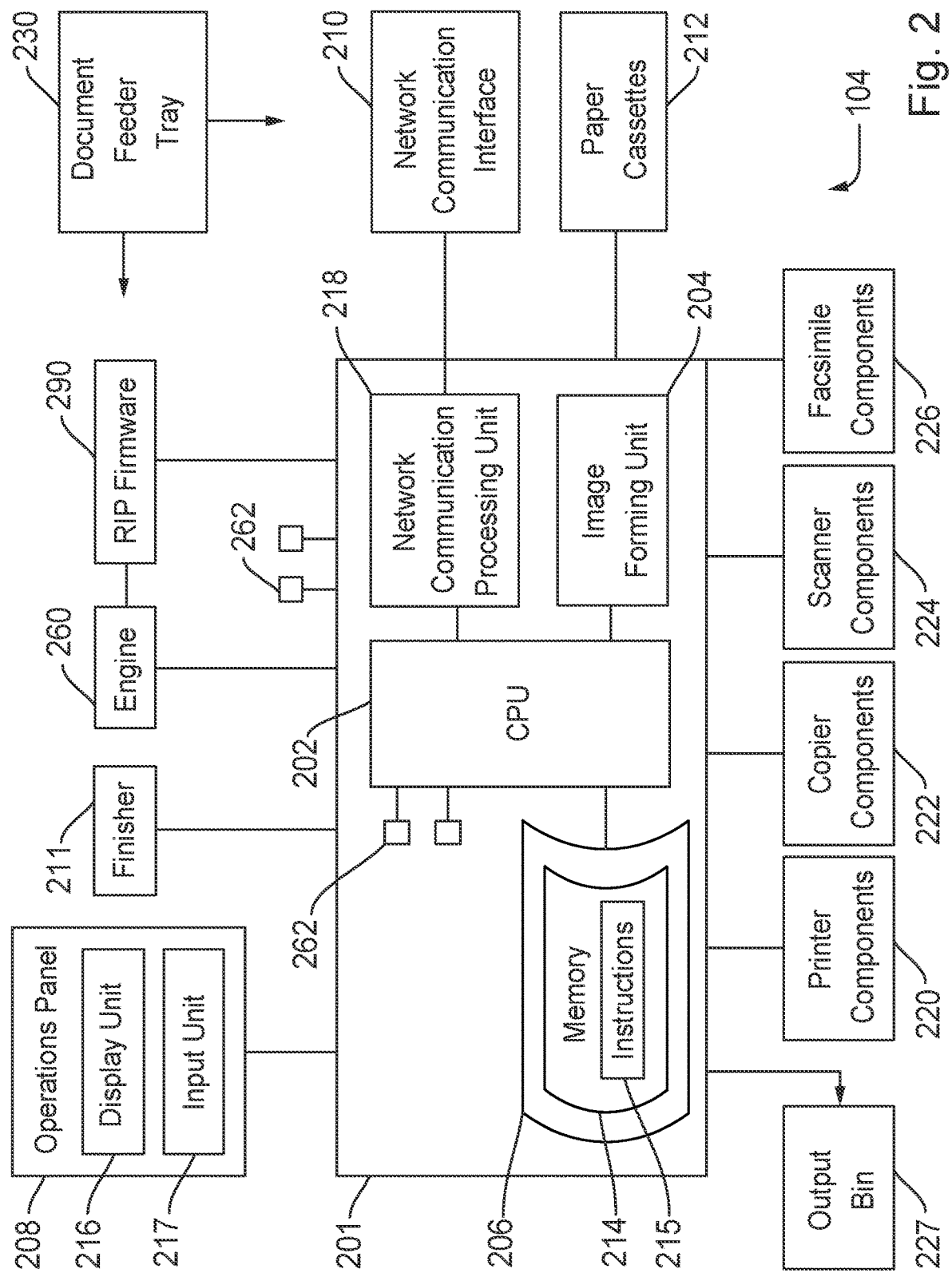
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from client device 110 and print management server 108, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused.

Document processor input feeder tray 230 may include the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226.

In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFB 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with client devices 110 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 110 and print management server 108.

Figure 3:
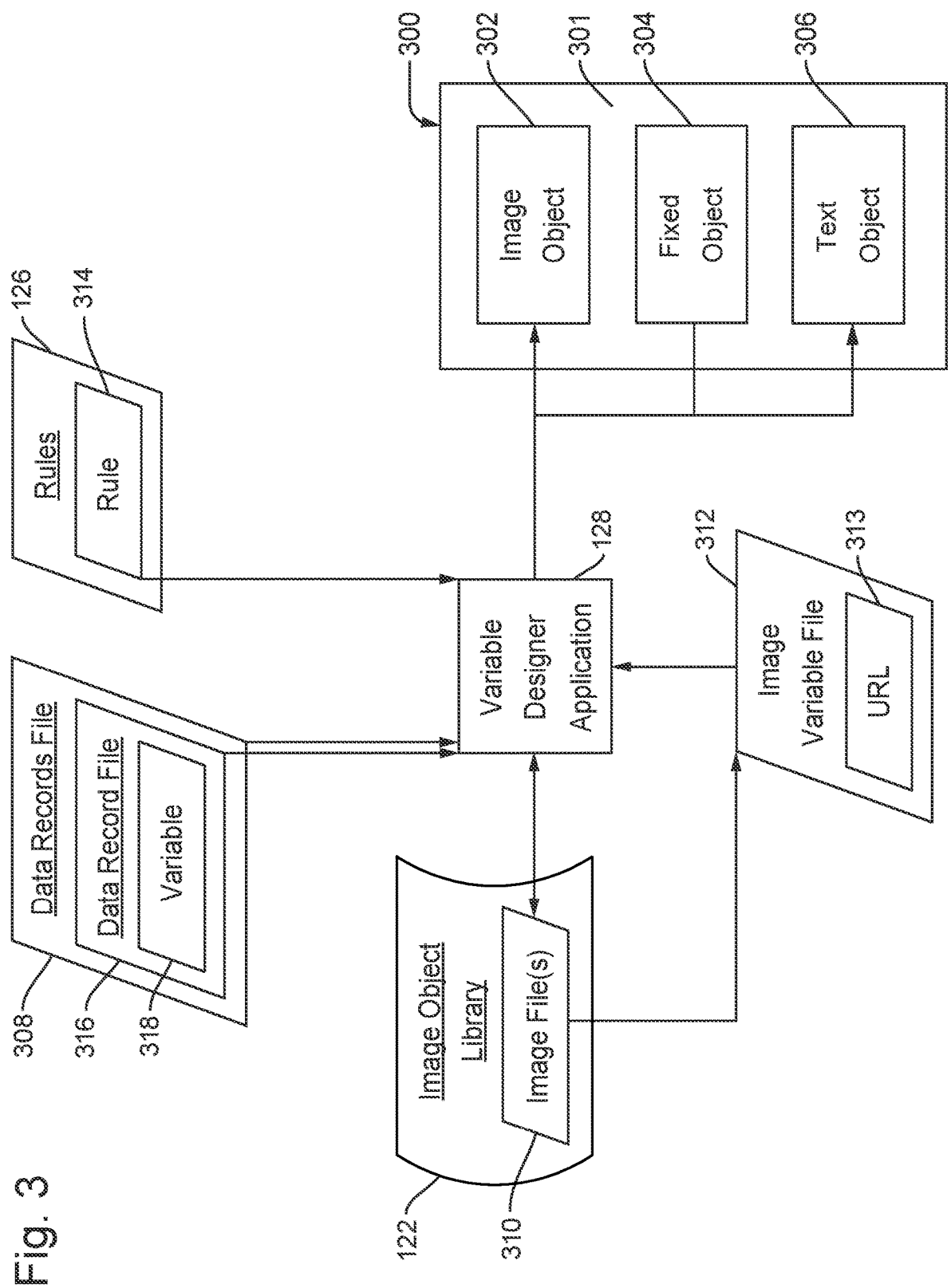
FIG. 3 illustrates an example document having an image object for use with variable data printing operations according to the disclosed embodiments.

FIG. 3 depicts an example document 300 having an image object 302 for use with variable data printing operations according to the disclosed embodiments. Document 300 may be a document for use in variable printing operations, such as a postcard, flyer, brochure, and the like. Document 300 may include a document template 301 that defines positions of image object 302, fixed object 304, and text object 306 within the document. Preferably, a large plurality of different versions of document 300 are generated where image object 302 and text object 306 may be variable and fixed object 304 is not. Different versions of document 300 may be created and generated based on the variable objects.

Image object 302 may be filled with one of a plurality of image files 310. For example, image files 310 include image files such s image file 1, image file 2, image file 3, and image file 4. As shown, variable designer application 128 may select one of the plurality of image files 310 to insert into image object 302. The selected image may be shown as image variable file 312. Image files 310 may be imported or obtained from image object library 122. Variable designer application 128 may not need every image within image object library 122, so that the user or selection process may select image files to place into document template 301. For example, image file 1, image file 2, image file 3, and image file 4 may be used to fill out document template 301 to generate document 300.

Document template 301 for document 300 may include fixed object 304. Fixed object 304 may be a fixed image used in every document 400 printed. Fixed object 304 also may be an image or text that provides information to the recipient of document 300, such as name of the sender, an address for the sender, a picture of a product, and the like.

Image variable file 312 may be selected from one of the plurality of image files 310. Which image is selected may be based on a variable 318 from a data record file 316 being used for this specific document. This feature is disclosed in greater detail below. Image variable file 312 also may be selected according to a defined rule 314 of rules 126. Image variable file 312 may include URL 313 that directs application 128 to a location of the associated image file to be placed in document 300.

Variable designer application 128 also may import data records file 308 having content to fill out other objects within document 300, such as text object 306. Data records file 308 preferably also includes locations of the images that are added to the documents of VDP print job 113. These images, barcodes, and text, as disclosed below, may be variable content. For example, data records file 308 may be names and addresses of potential customer list stored on client device 110 or print management server 108. Data record file 316 for each data file is provided to variable designer application 128 to generate document 300 using document template 301. As disclosed above, data record file 316 may include variable 318. For example, if variable 318 is "2," then image file 2, is selected to be placed in image object 302.

Image variable file 312 also may be selected according to a rule 314. Rule 314 may specify one or more conditions that need to be met in order to use a particular image file. When creating document template 301, the disclosed embodiments may define a rule stating that the selected image file for image object 302 correspond to an age of the person associated with record file 316. Thus, variable 318 is the person's age. Based on rule 314, one of plurality of image files 310 is provided. For example, if variable 318 is 33 and rule 314 specifies that image file 4, or 3104, is used for addressees between the ages of 25-40, then image file 4 is provided as image variable file 312 to fill image object 302.

Using these features, the disclosed embodiments may select specific documents generated according to data records file 308, plurality of image files 310, and rule 314. The disclosed embodiments are interested in the different results from the application of these items by variable designer application 128. A document record will be added for each unique image file of plurality of image files 310. Thus, a document 300 will be generated and added to the preview set of records having image files 310, such as image file 1, image file 2, image file 3, and image file 4, as applicable.

Further, for each rule 314, a document 300 generated for each outcome of the rule will be added. In other words, a record of a document will be added for each condition of the rule. Further, if there are unique image files used, such as for fixed object 304, then a document having each unique image file should be added. Uniqueness may be based on the different URLs used to retrieve image files from image object library 122. Uniqueness should be evaluated using the complete image URL.

Figure 4:
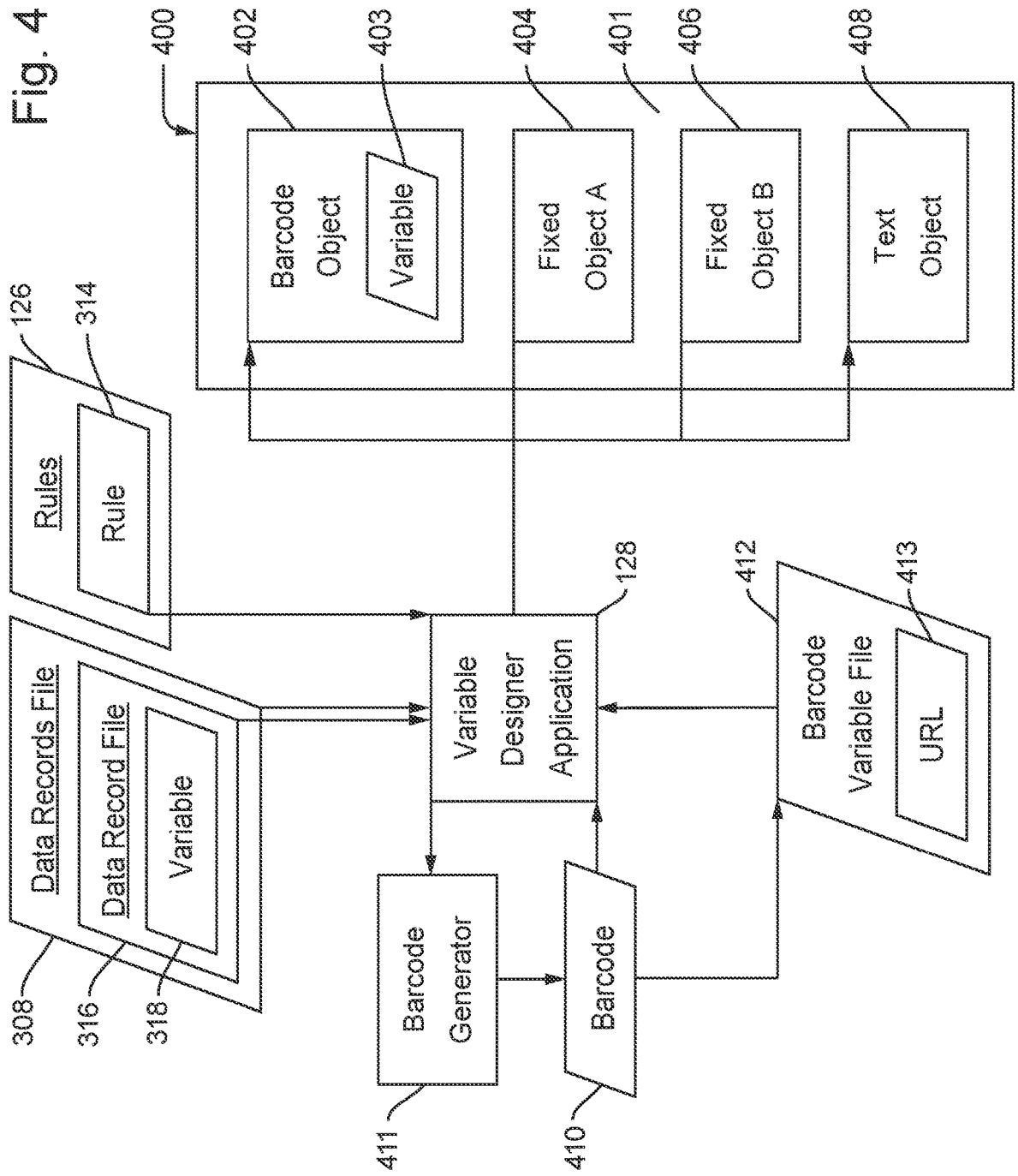
FIG. 4 illustrates an example document having a barcode object for use with variable data printing operations according to the disclosed embodiments.

FIG. 4 depicts a document 400 having a barcode object 402 for variable data printing operations according to the disclosed embodiments. Document 400 may be a document for use in variable printing operations, such as a postcard, flyer, brochure, and the like. Document 400 may include a document template 401 that defines positions of barcode object 402, fixed objects 404 and 406, and text object 408 within the document. Preferably, a large plurality of different versions of document 400 are generated where barcode object 402 and text object 408 may be variable and fixed objects 404 and 406 are not. Different versions of document 400 may be created and generated based on the variable objects.

Some features of FIG. 4 may be the same as those shown in FIG. 3. Those features are not repeated here. A barcode may refer to any graphic that includes a data representation to provide information that is transformed into a digital form for use by another device. For example, a barcode may include machine-readable data that represents a number, a URL, and the like. In some embodiments, a barcode may be a QR code. Barcodes may help provide information within a document 400 that would otherwise clutter the appearance of the document or not make sense.

Barcode object 402 may be filled with one of a plurality of barcodes 410. For example, barcodes 410 may include barcode 1, barcode 2, barcode 3, and barcode 4. As shown, variable designer application 128 may select one of the plurality of barcodes 410 to insert into barcode object 402. The selected barcode may be shown as barcode variable file 412. Variable designer application 128 may include barcode generator 411 that generates barcodes 410 on demand as part of the composition of document 400. Records of barcodes 410 may be stored in barcode object library 124. The disclosed embodiments compose a barcode image for each record, or document, using the text information in the data record file 316. Content is rendered and added to the document. Multiple barcodes may be used. For example, barcode 1, barcode 2, barcode 3, or barcode 4 may be used to fill out document template 401 to generate document 400.

Document template 401 for document 400 may include fixed objects 404 and 406. Fixed object 404, shown as fixed object A, may be an image or text that indicates instructions or other information related to the use of barcode object 402 printed on document 400. Fixed object 404 also may be an image variable, used as disclosed above. Fixed object 406, shown as fixed object B, also may be an image or text that provides information to the recipient of document 400, such as name of the sender, an address for the sender, a picture of a product, and the like.

Barcode variable file 412 may be selected from one of the plurality of barcodes 410. Which barcode is selected may be based on a variable 318 from a data record file 316 being used for this specific document, as disclosed above for image variable file 312. Barcode variable file 412 also may be selected according to a defined rule 314 of rules 126. Barcode variable file 412 may include URL 413 that directs application 128 to a location of the associated image file to be placed in document 400. This URL may be different than any URL information provided by the actual barcode used within barcode object 402.

Variable designer application 128 also may import data records file 308 to fill out other objects within document 400, such as text object 408. For example, data records file 308 may be names and addresses of potential customer list stored on client device 110 or print management server 108. Data record file 316 for each data file is provided to variable designer application 128 to generate document 400 using document template 401. As disclosed above, data record file 316 may include variable 318. For example, if variable 318 is "2," then barcode 3 is selected to be placed in barcode object 402.

Barcode variable file 412 also may be selected according to a rule 314. Rule 314 may specify one or more conditions that need to be met in order to use a particular barcode. When creating document template 401, the disclosed embodiments may define a rule stating that the selected barcode for barcode object 402 correspond to a location of the person or household associated with record file 316. Thus, variable 318 is a mailing address or location code, such as a zip code, that varies between record files. Based on rule 314, a barcode 410 is provided. For example, if variable 318 is 22201 for a zip code and rule 314 specifies that barcode 1 is generated for addresses having this zip code, then barcode 1 is provided as barcode variable file 412 to fill barcode object 402 and possibly used for other records using this zip code.

Using these features, the disclosed embodiments may select specific documents generated according to data records file 308, plurality of barcodes 410, and rule 314. The disclosed embodiments are interested in the different results from the application of these items by variable designer application 128. A document record will be added for each unique barcode file of the plurality of barcode files 410. Thus, a separate document 400 will be generated and added to the preview set of records for each of barcode file 1, barcode file 2, barcode file 3, and barcode file 4.

Further, for each rule 314, a document 400 generated for each outcome of the rule will be added. In other words, a record of a document will be added for each condition of the rule. Further, if there are unique image files used, such as for fixed objects 404 and 406, then a document having each unique image file should be added. Uniqueness may be based on the different URLs used to retrieve image files from barcode object library 124. Uniqueness should be evaluated using the complete image URL.

In addition, barcode object 402 may include one or more barcode variables 403. Such variables may relate to information provided within the barcode placed in document 400. It may be a number, name, or other information apart from the barcode. The disclosed embodiments will include a document 400 within the preview set of records for the print job for the longest barcode variable 403 and the shortest barcode variable 403. Thus, at least two documents having different barcode variables should be included in the preview set of documents provided to the user by variable designer application 128. In some cases, VDP print job 113 may use the same barcode for every document. More likely, however, VDP print job 113 may use a unique barcode for each record, in which case the barcodes are treated more like text variables, as disclosed below.

Figure 5:
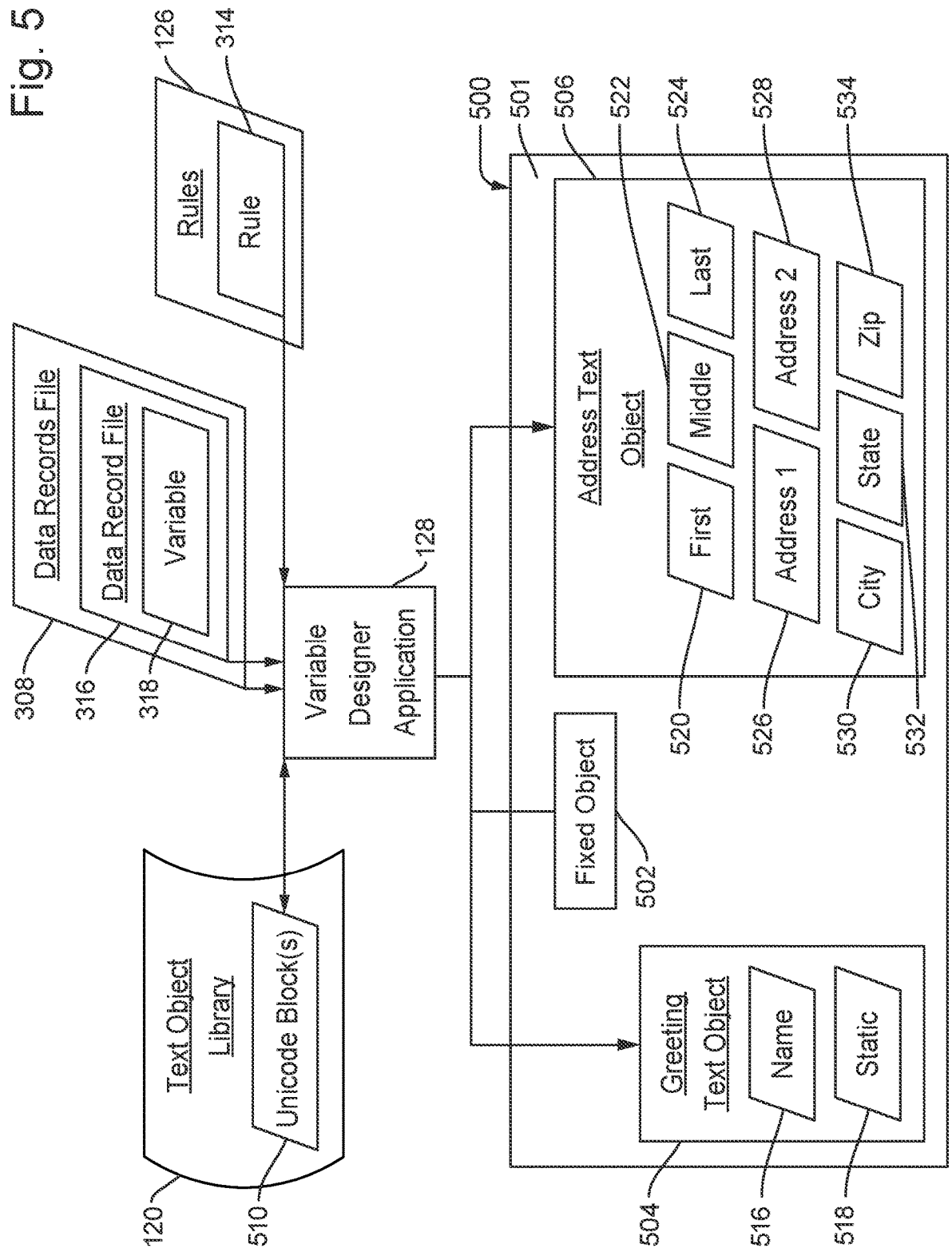
FIG. 5 illustrates an example document having text objects for use within variable data printing operations according to the disclosed embodiments.

FIG. 5 illustrates a document 500 having text objects 504 and 506 for use within variable data printing operations according to the disclosed embodiments. Document 500 may be a document for use in variable printing operations, such as a postcard, flyer, brochure, and the like. Document 500 may include a document template 501 that defines positions of fixed object 502 and text objects 504 and 506 within the document. Preferably, a large plurality of different versions of document 500 are generated where one of more text variables without text objects 504 and 506 are variable and fixed object 502 is not. Different versions of document 500 may be created and generated based on the variable objects.

As disclosed above, variable designer application 128 may process data, information, criteria, and rules to fill the objects within each document 500 according to document template 501. For document 500, variable designer application 128 may fill text objects 504 and 506 with different text variable data, such as names or address data. Text object 504 may be referred to as greeting text object 504, as it includes a greeting or suggestion. Text object 506 may be referred to address text object 506, as it includes text variables related to names and addresses within data records file 308. For text objects having text variables, there may be more than one variable as disclosed below. Fixed object 502 may be text, an image, a barcode, or the like, that is included in every document 500.

Greeting text object 504 includes text variable 516 and static text 518. Text variable 516 may be referred to as name text variable 516. Variable designer application 128 may fill name text variable 516 with the name information provided in data record file 316 by one or more variables 318. Static text 518 may be text that is placed in every document 500 and provided with document template 501. Alternatively, it may be provided by text object library 120 if the user selects a pre-made format available to variable designer application 128. The size of the data within greeting text object 504 may vary as the names are different lengths. There may be a document with the longest record for name text variable 516 and a document with the shortest record for name text variable 516.

Address text object 506 may include several text variables, each having different data that is placed within the text object according to document template 501. For example, address text object 506 may include first name text variable 520, middle initial text variable 522, last name text variable 524, address 1 text variable 526, address 2 text variable 528, city text variable 530, state text variable 532, and zip code text variable 534. The data for these data variables may be provided by a plurality of variables 318 of data record file 316. Each text variable may include a longest record and a shortest record as the data for each variable differs in length or size. Further, some text variables may not have any data, such as middle initial text variable 522 or address 2 text variable 528.

Some text variables or static text may come from Unicode blocks instead of standard Basic Latin text. For example, symbols such as μ, Δ, Σ, ≠, ™, β, and the like may be used for "text" within document 500. The symbols differ between different Unicode blocks. For example, some text may be from the Greek and Coptic Unicode block and other text from the Cyrillic Unicode block. Thus, Unicode blocks 510 may be provided. Unicode blocks 510 may include Unicode block 1 and Unicode block 2 that include separate groups of special text, or symbols, used to generate documents 500. When previews are generated, variable designer application 128 may access Unicode blocks 510 so that illegible data is not shown in the preview. The appropriate text or symbol from the identified Unicode block is shown. Unicode blocks 510 for use with the disclosed embodiments may be stored at text object library 120 or a word processing application used to generate VDP print job 113.

Placement of text variables also may be subject to a rule 314 of rules 126 defined for the print job of documents 500. Rule 314 for text variables may state that if no middle initial text variable 522 is used, then first name text variable 520 and last name text variable 524 are placed next to each other, or, in other words, middle initial text variable 522 is removed. Another rule may define that if there is no data for address 2 text variable 528, then city text variable 530 and state text variable 532 are placed directly underneath address 1 text variable 526, or, in other words, address 2 text variable is removed within address text object 506.

FIG. 6 depicts a block diagram of sets of documents to generate a preview set 600 of documents 500 according to the disclosed embodiments. As disclosed above, variable designer application 128 enables a user to generate data for variable data printing operations that can relate an area of a page with data and information stored one or more databases, such as at print management server 108 or within client device 110. Application 128 than may transmit VDP print job 113 having the generated data to print a plurality of documents 500 to printing device 104.

As disclosed above, a user of variable designer application 128 is permitted to change print contents, such as text, image, and barcode data, using information stored in object libraries or databases. If a large amount of information is stored, then the user may hesitate to perform layout confirmation for all information stored and used to generate documents 500. It is not realistic to perform preview displays for printed documents that include the actual content being printed. Thus, instead of performing preview displays for all actual output products, or documents 500, a user usually confirms only the position of each area for the layout confirmation. This confirmation, however, still may provide enough for the user to determine if documents 500 will be printed in an acceptable manner More specifically, the user cannot check whether there is any problem in a printed document due to an undesirable combination of texts and images. Such problems include any text portion that one cannot read or any image portion that one cannot view. Thus, one may want to perform a preview display for each document actually printed. This process may be difficult to perform for all preview displays, or layout confirmations, for the printed documents. The amount of information and data stored in the libraries and database may reach the level of several thousand records or more.

If the number of preview displays is reduced, then confirmation may be performed in a reasonable manner Current methods, however, fail when considering complex designs, especially those having rule-based composition. Further, it may not take into account varying sizes and types of data used to populate the document templates. The disclosed embodiments use a smart filter approach to generate a subset 600 of documents shown to the user.

Documents may relate to the term "records" used above in that there is a set of records used to generate documents 500 for VDP print job 113. The disclosed embodiments seek to build sets of documents 500 based on text variables used within the text objects, as disclosed above. These sets of documents include the shortest and longest records for each text variable. Thus, a set 602 of documents 500 having the longest records is added. Set 602 may include longest name text variable 516, longest first name text variable 520, longest middle initial text variable 522, longest last name text variable 524, longest address 1 text variable 526, longest address 2 text variable 528, longest city text variable 530, longest state text variable 532, and longest zip code text variable 534.

The same with the documents having the shortest records for the text variables listed above. A set 604 of documents 500 having the shortest records is added to preview set 600. Set 604 may include shortest name text variable 516, shortest first name text variable 520, shortest middle initial text variable 522, shortest last name text variable 524, shortest address 1 text variable 526, shortest address 2 text variable 528, shortest city text variable 530, shortest state text variable 532, and shortest zip code text variable 534.

Set 606 of documents includes defined variable combinations of text variables used in a text object. These variable combinations include the records with the longest and shortest records. Referring to address text object 506, first name text variable 520, middle initial text variable 522, and last name text variable 524 may be used in various combinations. If address text object 506 only includes these text variables, then documents having the longest record for the combination of first name text variable 520 and middle initial text variable 522, the combination of first name text variable 520 and last name text variable 524, the combination of middle initial text variable 522 and last name text variable 524, and the combination of first name text variable 520, middle initial text variable 522, and last name text variable 524 are added to set 606. The shortest records for these combinations also are added. In some embodiments, address 1 text variable 526 and address 2 text variable 528 may be combined for this process. City text variable 530, state text variable 532, and zip code text variable 534 may be combined as well.

Set 610 of Unicode block records also may be added to preview set 600. The disclosed embodiments may add the longest and shortest records using each Unicode block, much like the text variable records disclosed above. Referring to FIG. 5, there may be separate records added for Unicode block 1 and Unicode block 2. Set 610 also may include the first record to use each Unicode block. It also may add a random record from documents that use a given Unicode block. The disclosed embodiments may give preference to records that use multiple Unicode blocks in order to minimize the total number of records in set 610. Records that include multiple Unicode blocks may be added, except those that include Basic Latin with the Unicode block.

Set 612 of image variable records is created by adding a record for each unique image file, unless each data record file 316 uses a unique image. For example, referring to FIG. 3, a record is added for the use of each of image file 1, image file 2, image file 3, and image file 4. Uniqueness may be evaluated using the complete image URL. If not covered by the above, then the disclosed embodiments add a record for each image object 302 that uses image variable files. For each image object 302 that uses rules, the disclosed embodiments add a record for each condition in the rule. For example, rule 314 may specify specific image files are used based on the age of a recipient of document 300. A record is added to set 612 for each age condition specified along with the corresponding image file set forth by rule 314. If image file 2 is specified for ages 0-21, image file 3 for ages 22-45, image file 4 for ages 46-90, and image file 1 is specified when age is not provided, then a record is added for each recipient that meets the age condition along with the appropriate image file embedded in the document to be printed.

Set 614 of barcode variables is created much like set 612, disclosed above. Further, some barcode variations are covered by filtering text variables as disclosed above with regard to sets 602, 604, and 606. Barcodes 410 are generated as requested by variable designer application 128 by barcode generator 411. If the barcode is a URL, then the disclosed embodiments add a record for each unique URL, unless each record uses a unique URL. Uniqueness may be evaluated using the complete URL in the barcode. For each barcode object 402 that uses text variables, the disclosed embodiments add the records with the shortest and longest variable combinations, as disclosed for set 606. For each barcode object 402 that uses rules, the disclosed embodiments add a record for each condition of the rule. Using the example above, a different barcode 410 may be embedded into barcode object 402 according to an age of the recipient. A record is added to set 614 for each condition set forth by rule 314 along with the corresponding barcode 410.

Set 608 of rules conditions also is created. This set may primarily be directed to rules regarding text variables as rules for images and barcodes are treated above. Those records, however, may be added here instead. For text variables, a record is added for each text object that uses rules. The disclosed embodiments add a record for each condition in the rule. As disclosed above, address text object 406 may include rules on placement of first name text variable 520 and last name text variable 524 depending on the existence of middle initial text variable 522. In another example, address text object 406 may implement rule 314 that states if (A), else if (B), else if (C), else if (D). Set 608 includes records in which each of these conditions, or A, B, C, and D, are true. It also would add records for when none of the conditions are true.

Set 608 also may include records for each document page that uses rules. For example, document 500 may include a rule on whether to include an image object on a page depending on a criterion, such as if the person associated with the data record file 316 is an exclusive member. Rule 314 may specify if this condition is met, then an image object 302 is placed on the page of the document. Set 608, therefore, includes a record where image object 302 is on the page and a record when it is not.

Preview set 600 of documents, or records, to view is generated by adding in sets 602, 604, and 606, and, if applicable, sets 608, 610, 612, and 614. Although preview set 600 may be larger than just using a single criterion for forming the preview documents, it provides a holistic approach to confirming VDP print job 113 is acceptable. Although documents 300, 400, and 500 are disclosed as separate documents, it should be understood that document 500, which is used generically in the disclosure provided above, may include the features of documents 300 and 400. In other words, preview set 600 may include records having variable text, images, and barcodes. Thus, the disclosed embodiments may process complex documents used in variable data printing operations that include many different types of objects having variable data.

Each record of preview set 600 may display information stating why it is included in the filtered preview. This feature will help users understand what they should be evaluating when they look at each record or document in the preview.

FIG. 7 depicts a flowchart 700 for identifying a preview set 600 of documents for variable data printing operations according to the disclosed embodiments. Flowchart 700 may refer to FIGS. 1-6 for illustrative purposes. Flowchart 700, however, is not limited to the embodiments shown in FIGS. 1-6.

Step 702 executes by accessing a plurality of data records, shown as data records file 308, having defined variable objects within the documents. Preferably, a document template is created using variable designer application 128 to place text objects, image objects, and barcode objects as well as define rules to govern the use of the data and information to populate the objects. As disclosed above, multiple objects may be defined as well as the combined use of different objects to print documents for VDP print job 113.

Step 704 executes by determining sets 602 and 604 that include records of the longest and shortest text variables, respectively, for each text object. They also may include the longest and shortest use of each text variable. Referring to FIG. 5, if address text object 408 only includes names for addressees, then set 602 includes a longest record for first name text variable 520, middle initial text variable 522, and last name text variable 524, as well a record with the longest use of all the text variables within address text object 408. Set 604 is generated in the same manner, except using the shortest records of the text variables.

Step 706 executes by determining set 610 that include records of Unicode block variables, or text from different Unicode blocks. The generation of set 610 is disclosed above. Step 708 executes by determining set 606 that includes the variable combinations of the text variables in a text object. Step 708 is performed for each text object that uses text variables. As disclosed above, the variable combinations include a longest combination of each variable combination and a shortest combination of each variable combination.

Step 710 executes by determining set 612 that includes the records for image variables. The generation of set 612 is disclosed above. Step 712 executes by determining set 614 that includes the records for barcode variables. The generation of set 614 is disclosed above. Step 714 executes by determining set 608 that includes the records based on any rules 126 defined for the different objects, especially those related to the use of text variables. The generation of set 608 is disclosed above.

Step 716 executes by generating preview set 600 of documents of VDP print job 113 using the records of the sets defined above. These sets, if applicable, are added to preview set 600, as disclosed above. Step 718 executes by displaying preview set 600 to the user, such as on display 132 of client device 110. Preview set 600 also may be displayed at printing device 104 using the components set forth in FIG. 2.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for identifying a preview set of documents used in variable data printing operations, the method comprising:
   accessing a plurality of records having text objects or image objects for a document template printable at a printing device, wherein at least one text object includes text variables and at least one image object includes image variables;
   determining a first set of records including a longest record of each text variable of the text variables of the at least one text object;
   for the at least one text object, identifying a second set of records having variable combinations of the text variables, wherein the variable combinations include a longest combination of each variable combination;
   determining that the at least one text object corresponds to a rule having a condition;
   determining a third set of records based on the condition for the rule as applied to the at least one text object; and
   generating the preview set of documents from the first set of records, the second set of records, and the third set of records.

2. The method of claim 1, further comprising identifying a fourth set of records having text or a symbol from at least one Unicode block within at least one text object.

3. The method of claim 2, wherein the identifying the fourth set of records includes identifying a longest record having the text or the symbol from the at least one Unicode block.

4. The method of claim 2, wherein the identifying the fourth set of records includes identifying a random record having the text or the symbol from the at least one Unicode block.

5. The method of claim 1, wherein identifying the second set of records includes identifying variable combinations having a shortest combination of each variable combination.

6. The method of claim 1, wherein the determining the first set of records includes determining the first set of records including a shortest record of each text variable of the text variables of the at least one text object.

7. The method of claim 1, further comprising identifying a fifth set of records for each unique image variable applicable to the at least one image object, wherein the fifth set of records is included in the preview set of documents.

8. The method of claim 7, further comprising determining that one of the at least one image object corresponds to a rule having a condition.

9. The method of claim 8, further comprising determining a sixth set of records based on the condition for the rule as applied to the one of the at least one image object, wherein the sixth set of records is included in the preview set of documents.

10. A method for identifying a preview set of documents used in variable data printing operations, the method comprising:
 accessing a plurality of records having text objects or barcode objects for a document template printable at a printing device, wherein at least one text object includes text variables and at least one barcode object includes barcode variables;
 determining a first set of records including a longest record of each text variable of the text variables of the at least one text object;
 for the at least one text object, identifying a second set of records having variable combinations of the text variables, wherein the variable combinations include a longest combination of each variable combination;
 determining that the at least one text object corresponds to a rule having a condition;
 determining a third set of records based on the condition for the rule as applied to the at least one text object;
 identifying a fourth set of records having at least one barcode variable of the barcode variables; and
 determining that one of the at least one barcode variable corresponds to a rule having a condition;
 determining a fifth set of records based on the condition for the rule as applied to the one of the at least one barcode variable; and
 generating the preview set of documents from the first set of records, the second set of records, the third set of records, the fourth set of records, and the fifth set of records.

11. The method of claim 10, wherein the determining the first set of records includes determining the first set of records including a shortest record of each text variable of the text variables of the at least one text object.

12. The method of claim 10, further comprising identifying a sixth set of records having text or a symbol from at least one Unicode block within at least one text object, wherein the preview set of documents includes the sixth set of records.

13. The method of claim 12, wherein the identifying the sixth set of records includes identifying a longest record having the text or the symbol of the at least one Unicode block.

14. The method of claim 10, further comprising adding a seventh set of records to the preview set of documents, wherein the seventh set of records includes a unique image variable applicable to at least one image object used in the document template.

15. A method for identifying a preview set of documents to be used in a print job according to variable data printing operations, the method comprising:
 accessing a plurality of records having text objects subject for a document template for the documents printable at a printing device, wherein at least one text object includes text variables located in separate positions within the text object;
 determining a first set of records including a shortest record and a longest record of each location of a text variable of the text variables of the at least one text object;
 for the at least one text object, identifying a second set of records having variable combinations of the text variables, wherein the variable combinations include a longest combination of each variable combination and a shortest combination of each variable combination;
 generating the preview set of documents from the first set of records and the second set of records; and
 providing the preview set of documents for a preview of the print job at a computing device connected to the printing device.

16. The method of claim 15, wherein the determining the first set of records includes determining the first set of records including a shortest record of each text variable of the text variables of the at least one text object.

17. The method of claim 15, further comprising identifying a third set of records having text or a symbol from at least one Unicode block within at least one text object, wherein the preview set of documents includes the third set of records.

18. The method of claim 16, wherein the identifying the second set of records includes identifying a longest record having the text or the symbol from the at least one Unicode block.

19. The method of claim 16, wherein the identifying the second set of records includes identifying a random record having the text or the symbol from the at least one Unicode block.

20. The method of claim 15, further comprising determining that the at least one text object corresponds to a rule having a condition;
 determining a fourth set of records based on the condition for the rule as applied to the at least one text object; and
 adding the fourth set of records to the preview set of documents.

* * * * *